F. H. AVERS.
MOTION PICTURE CAMERA.
APPLICATION FILED MAR. 6, 1917.
1,245,856.
Patented Nov. 6, 1917.
2 SHEETS—SHEET 1.
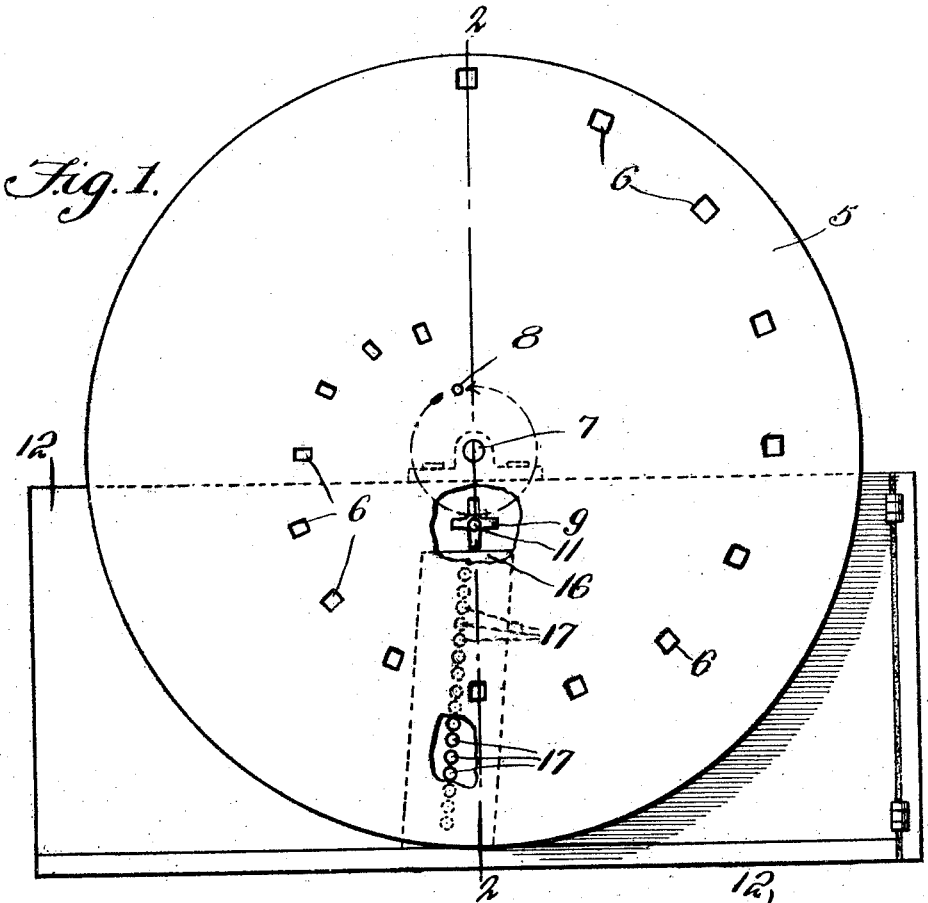
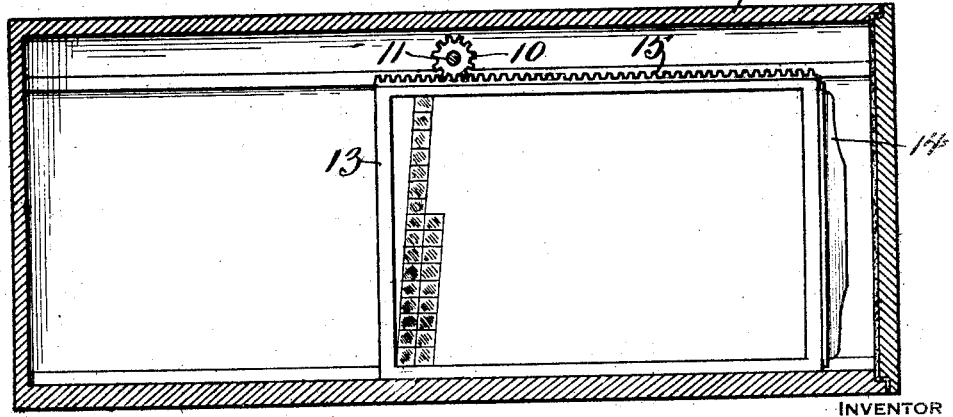
WITNESS
J. T. L. Wright
INVENTOR
Franklin H. Avers
BY Victor J. Evans
ATTORNEY

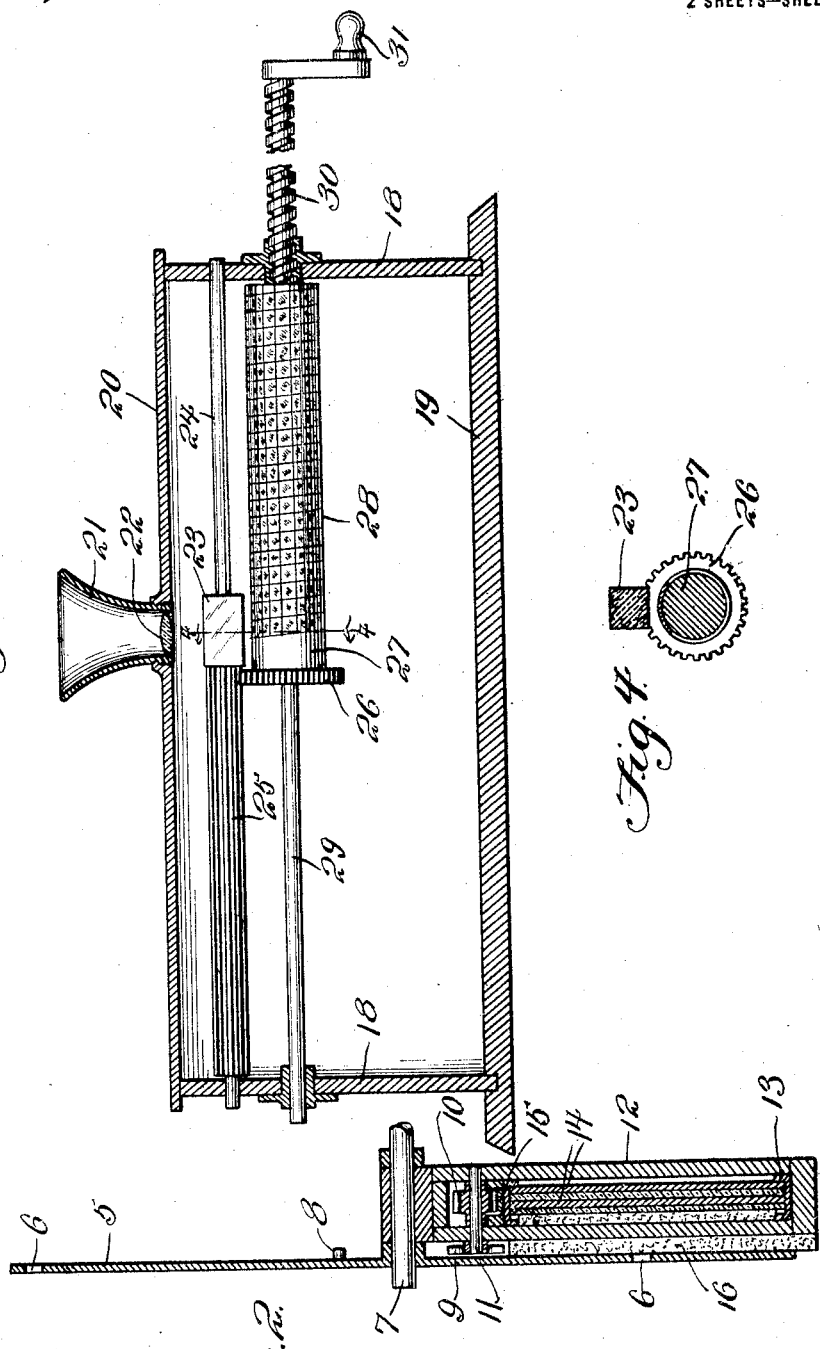

UNITED STATES PATENT OFFICE.

FRANKLIN H. AVERS, OF PORTAGE, WISCONSIN.

MOTION-PICTURE CAMERA.

1,245,856.  Specification of Letters Patent.  Patented Nov. 6, 1917.

Application filed March 6, 1917. Serial No. 152,686.

*To all whom it may concern:*

Be it known that I, FRANKLIN H. AVERS, a citizen of the United States, residing at Portage, in the county of Columbia and State of Wisconsin, have invented new and useful Improvements in Motion-Picture Cameras, of which the following is a specification.

This invention is an apparatus for taking motion or animated pictures, wherein the usual or customary dry plate or film may be used in conjunction with the ordinary double plate holder.

The invention contemplates using a rotary shutter provided with a series of light openings formed therein and spirally arranged therein, and a pinion to coöperate with a star wheel carrying a pinion to coöperate with a rack secured to a carrier for moving a plate holder a predetermined distance, and a series of lenses disposed between the shutter and the plate holder so that each one of the light openings will register with one of the lenses.

The invention also contemplates using a suitable receptacle so that the device may be as compact as possible and the working parts protected from injury and climatic conditions.

In the drawings:—

Figure 1 illustrates a front elevation;

Fig. 2 is a sectional view on the line 2—2 of Fig. 1; and

Fig. 3 is a side elevation of the reproducing machine.

Fig. 4 is a sectional view on the line 4—4 of Fig. 3, and Fig. 5 is a longitudinal sectional view of the plate holder carrier.

In the preferred embodiment, which will be described, the shutter 5 is preferably of circular form and may be made of any suitable material and may also be of any desired thickness. In the shutter 5 there is formed a series of light openings 6, which are shown as being trapezoidal in form. These light openings, which are of varying widths, are arranged in spiral form and begin adjacent the central portion of the shutter and terminate near the periphery. These openings are preferably spaced from each other in such a manner that they will coöperate with either of the elements to be hereinafter described. It will be noticed that the opening near the periphery of the shutter admits of the spacing in a radial and circumferential direction from the first opening adjacent the center of the shutter.

This shutter 5 may be suitably supported in any desired manner, one form of support being shown by the shaft 7. Disposed radially from the shaft 7 is a projection or pin 8, which extends from the face of the shutter in an axial direction. This projection or pin 8 is adapted to coöperate with the arms of a star wheel 9, which also carries a pinion 10. This star wheel 9 and the pinion 10 may be mounted or carried upon a suitable support, such as is shown by the shaft 11. It may be preferred to permit the star wheel and pinion to rotate upon a stud, although any desired means may be used.

Disposed adjacent the lower half of the shutter is a camera box 12 into which is adapted to move a plate holder 13. This plate holder may be of the usual customary form and type that carries two plates or films separated by a septum. This plate holder 13 is provided with the usual slides 14. The plate holder 13 may be provided with a rack 15 mounted upon one edge. This rack 15 may or may not be permanently secured to the plate holder 13, as it may be desired to reverse the holder in order to use the plate or film positioned upon the other side, when if the rack were permanently secured to one side, it would not be possible to reverse the holder.

The rack 15 is so positioned with regard to the holder 13 that it will coöperate with the pinion 10, which when the star wheel 9 is actuated by the projection or pin 8, will impart the movement to the plate holder through this rack 15.

Upon one side of the camera box 12, there is provided a suitable support 16, which has mounted therein a series of lenses 17. These lenses 17 are spaced apart a sufficient distance so that each one will register with its proper light opening 6 formed in the shutter 5. These lenses 17 are shown as being slightly offset on a radial line of the shutter 5. This is done in order that the pictures or negatives produced on the plate or film may be slanted so that when printed upon a suitable medium the positives can be separated or if desired the print may be kept whole and mounted upon a suitable cylinder for reproduction purposes. This will form the pictures in a proper manner for the spiral movement of the cylinder.

This apparatus which has just been described is adapted more particularly for the taking of consecutive negatives upon a flat surface, and while no particular means have been shown and described as inclosing the whole apparatus, the same may be inclosed in any workman-like manner.

In Fig. 3 there is illustrated the viewing or reproduction apparatus, which comprises a frame having end members 18, base member 19, and a top member 20. These several members may be secured together and to the base in any usual or customary manner. Disposed upon the top member 20 is a conical member 21 which is adapted to concentrate the rays of light upon the lens 22. This lens 22 is preferably of the magnifying or double convex type and is positioned midway between the end members 18, so that it will coöperate with a light interrupter or interferer 23. This light interrupter 23 it is preferred to have in the form of a glass cube. This cube is mounted upon a shaft 24, which is suitably journaled in the end members 18. As shown, this shaft 24 at one end is plain and upon the other end between one of the end members 18 and the light interrupter 23 is positioned a pinion 25.

This pinion 25 is adapted to coöperate with a gear wheel or spur gear 26. This gear 26 may be secured to the cylinder 27 in any convenient manner. On this cylinder 27 there is mounted the positive prints which were obtained in printing from the negatives produced by the taking camera. This positive portion is indicated by the numeral 28, and the pictures are shown as being spirally arranged upon the cylinder.

Passing through the cylinder 27 and the gear 26 is a shaft 29, which is plain at one portion, and upon the other portion there are formed screw threads 30. One end of the shaft 29 is suitably journaled in the end member 18, while the threaded portion 30 is adapted to coöperate with a suitable threaded aperture formed in the other end member 18. Attached to one end of the threaded end of the shaft 30 is a conventional handle 31, which may be secured to the shaft in any convenient way. By means of this handle 31, the cylinder 27 may be rotated and also moved in a longitudinal direction by means of the screw threads 30 coöperating with the threaded aperture formed in the end member 18. The rotary movement of the cylinder 27 is communicated by means of the gear 26 to the pinion 25 and the ratio of the gearing is preferably four to one so that the glass cube 23 is rotated four times to one revolution of the cylinder 27.

The rotation of this cube 23 produces an interference of light so that the positives mounted upon the cylinder 27 will appear as motion or animated pictures.

No means have been shown and described for rotating the shutter 5 of the taking camera, as any suitable or convenient means may be employed.

Minor changes in the proportions and details of construction may be resorted to without departing from the spirit of my invention or the scope of the appended claims.

I claim:—

1. An apparatus for taking motion pictures, comprising a rotatable shutter provided with spirally arranged light openings, a carrier for a sensitized medium adapted to be acted upon by light, a series of lenses disposed between the shutter and the sensitized medium and adapted to operate successively within the light openings formed in the shutter, and means to move the carrier so that each of the light openings will register properly with a lens.

2. An apparatus for taking motion pictures comprising a shutter having light openings arranged in a spiral manner, a carrier for a sensitized medium adapted to be acted upon by light, a series of lenses disposed between the medium and the shutter, a rack for the carrier, a pinion provided with radially extending arms to engage with the rack, and a projection formed on the shutter adapted to coöperate with the arms to move the carrier a predetermined distance so that a light opening will register with a lens.

In testimony whereof I affix my signature.

FRANKLIN H. AVERS.

Copies of this patent may be obtained for five cents each, by addressing the "Commissioner of Patents, Washington, D. C."